(12) United States Patent
Meyer et al.

(10) Patent No.: US 11,815,154 B2
(45) Date of Patent: Nov. 14, 2023

(54) DRIVE TRAIN HAVING CENTRIFUGAL PENDULUM

(71) Applicant: Schaeffler Technologies AG & Co. KG, Herzogenaurach (DE)

(72) Inventors: Vincent Meyer, Hochstett (FR); Nicolas Waltz, Aschbach (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 324 days.

(21) Appl. No.: 17/055,266

(22) PCT Filed: May 6, 2019

(86) PCT No.: PCT/DE2019/100403
§ 371 (c)(1),
(2) Date: Nov. 13, 2020

(87) PCT Pub. No.: WO2019/219121
PCT Pub. Date: Nov. 21, 2019

(65) Prior Publication Data
US 2021/0123497 A1    Apr. 29, 2021

(30) Foreign Application Priority Data
May 16, 2018   (DE) .......................... 102018111773.6

(51) Int. Cl.
*F16F 15/14* (2006.01)
*F16H 57/00* (2012.01)

(52) U.S. Cl.
CPC ....... *F16F 15/145* (2013.01); *F16H 57/0006* (2013.01); *F16H 2057/0012* (2013.01)

(58) Field of Classification Search
CPC .............................................. F16H 2057/0012
See application file for complete search history.

(56) References Cited

U.S. PATENT DOCUMENTS

| 4,046,030 | A | 9/1977 | Suzuki |
| 2004/0069092 | A1 | 4/2004 | Schankin |
| 2007/0278029 | A1* | 12/2007 | Sugiyama .............. B60K 6/405 |
| | | | 180/65.23 |
| 2016/0215869 | A1* | 7/2016 | Marutani ................ F16H 59/76 |

FOREIGN PATENT DOCUMENTS

| CN | 107023610 A | 8/2017 |
| CN | 108019458 A | 5/2018 |
| DE | 19527112 C1 | 9/1996 |
| DE | 102008033679 A1 | 3/2009 |
| DE | 102008001050 A1 | 10/2009 |
| DE | 102010028849 A1 | 11/2011 |
| DE | 102012221854 A1 | 6/2014 |
| DE | 102014221637 A1 | 4/2016 |
| DE | 102016222575 A1 | 5/2017 |

(Continued)

*Primary Examiner* — Vicky A Johnson

(57) ABSTRACT

The disclosure relates to a drive train for a motor vehicle containing an internal combustion engine, a transmission connected downstream thereof, drive wheels and a differential arranged between the drive wheels and the transmission. In order to eliminate or at least reduce the vibrational eigenmodes behind the transmission, a centrifugal pendulum is assigned adjacent to the differential.

20 Claims, 1 Drawing Sheet

(56) References Cited

FOREIGN PATENT DOCUMENTS

| DE | 102016201534 A1 | 8/2017 |
|----|-----------------|--------|
| JP | H03129141 A     | 6/1991 |
| JP | H1172143 A      | 3/1999 |
| JP | 2014145441 A    | 8/2014 |
| WO | 2015043694 A    | 4/2015 |

\* cited by examiner

DRIVE TRAIN HAVING CENTRIFUGAL PENDULUM

CROSS-REFERENCE TO RELATED APPLICATIONS

This application is the U.S. National Phase of PCT Appln. No. PCT/DE2019/100403 filed May 6, 2019, which claims priority to DE 102018111773.6 filed May 16, 2018, the entire disclosures of which are incorporated by reference herein.

TECHNICAL FIELD

The present disclosure relates to a drive train for a motor vehicle containing an internal combustion engine, a transmission connected downstream thereof, drive wheels and a differential arranged between the drive wheels and the transmission.

BACKGROUND

Generic drive trains having an internal combustion engine and a transmission, for example an automated or manually operated gearshift, an automatic transmission or the like, which transmit a suitable torque via a differential to the drive wheels of a motor vehicle, have long been known for motor vehicles, for example from document DE 195 27 112 C1 and do not require further explanation. Due to the construction-related liability of the internal combustion engine with torsional vibrations and a resonance behavior of the motor vehicle, torques superimposed with torsional vibrations occur in the drive trains, which, as known for example from the publication DE 10 2016 222 575 A1, are damped by means of torsional vibration isolation devices, for example torsional vibration dampers such as dual-mass flywheels, clutch disc dampers, torsional vibration absorbers, such as centrifugal pendulums and/or the like, which are arranged between the internal combustion engine and the transmission. In this case, eigenmodes can remain after the transmission, which are not sufficiently damped by the torsional vibration isolation devices between the internal combustion engine and the transmission.

SUMMARY

The object of the invention is the development of a generic drive train. In particular, the object of the invention is to improve the torsional vibration isolation of a generic drive train.

The object is achieved by the subject matter of the claims and advantageous embodiments are described herein.

The proposed drive train is used to transmit a torque provided by an internal combustion engine to the drive wheels of a motor vehicle. To adapt the torque to the driving conditions of the motor vehicle, in particular to the driving speed, a transmission with a plurality of shiftable gears and a starting element, for example a friction clutch or a hydrodynamic torque converter, is provided between the internal combustion engine and the transmission. An input shaft of a differential is provided on the transmission output shaft of the transmission to compensate for the different cam speeds of the drive wheels. The drive wheels transmit the pending torque to the roadway and thus move the motor vehicle with the proposed drive train.

For primary torsional vibration isolation, one or a plurality of torsional vibration isolation devices can be arranged between the internal combustion engine and the transmission. For example, a torsional vibration damper such as a dual-mass flywheel can be received on the crankshaft of the internal combustion engine. A centrifugal pendulum can be integrated into the torsional vibration damper. Alternatively, a centrifugal pendulum can be integrated in a single-mass flywheel. Alternatively or additionally, a torsional vibration damper and/or a centrifugal pendulum can be received in a clutch disc of a friction clutch. In a drive train with a hydrodynamic torque converter, one or a plurality of torsional vibration dampers and/or centrifugal pendulums can be arranged outside and/or inside a converter housing.

To further improve the torsional vibration isolation from torsional vibrations in the drive train, a centrifugal pendulum is assigned adjacent to the differential. This means that a centrifugal pendulum is provided on the output side of the transmission and in the immediate vicinity of the differential. In this way, eigenmodes occurring at the differential can be effectively isolated by appropriate design of the centrifugal pendulum on these eigenmodes, said eigenmodes being in particular not sufficiently isolated from the torsional vibration isolation device(s) between the internal combustion engine and the transmission. Furthermore, the speed amplitudes of these eigenmodes occurring at the differential can be isolated directly from their occurrence at the differential by being in close proximity to the differential, without worsening or disrupting the existing isolation of the torsional vibration isolation devices between the internal combustion engine and the transmission.

The use of a centrifugal pendulum mounted adjacent to the differential has proven to be particularly advantageous if, for example, a drive shaft is provided between the transmission and the differential in a standard drive with a front-mounted internal combustion engine with transmission and rear-wheel drive. Here, the centrifugal pendulum can be arranged between the drive shaft and the differential.

An articulated connection, for example a universal joint, is preferably provided between the drive shaft and the input shaft of the differential. Here, the centrifugal pendulum can be received on the drive shaft or on the input shaft.

The centrifugal pendulum has a pendulum mass carrier that is connected non-rotatably to the drive shaft or the input shaft. On the pendulum mass carrier, pendulum masses are arranged distributed over the circumference and are received on the pendulum mass carrier by means of pendulum bearings. The pendulum bearings are formed from complementary raceways in the pendulum mass carrier and in the pendulum masses, on which a pendulum roller rolls. The selection of the curvature of the raceways, which specify a corresponding pendulum track of the pendulum masses, the design of the pendulum roller as a step roller or as a pendulum roller with constant diameter, the distance from the center of gravity of the pendulum mass to the axis of rotation and the like specify the properties of the centrifugal pendulum, in particular the absorber order, which is coordinated with the eigenmodes of the differential. Here, the pendulum masses are accelerated radially outwards due to the pendulum mass carrier rotating around the axis of rotation in the centrifugal force field and shifted from torsional vibrations to smaller radii that cancel out the torsional vibrations, so that the torque applied to the pendulum mass carrier settles depending on the centrifugal force and thus in a speed-adaptive manner.

The centrifugal pendulum can, for example, be designed in a plurality of embodiments. In a first embodiment, the pendulum mass carrier is designed as a pendulum flange on which pendulum masses are arranged on both sides. The axially opposite pendulum masses are axially spaced apart and connected by means of connecting means and thus form pendulum mass units. Preferably, two circumferentially spaced pendulum bearings per pendulum mass unit contain raceways in the axially opposite pendulum masses and a raceway in the pendulum flange, wherein the raceways axially overlap a pendulum roller and roll thereon.

In a further embodiment of the centrifugal pendulum, the pendulum mass carrier can be formed from two side parts, for example housing parts of the centrifugal pendulum housing, which form an axial free space therebetween in which the pendulum masses are received. The preferably two circumferentially spaced pendulum bearings per pendulum mass are each formed from raceways in the side parts and from a raceway in the pendulum mass, on which a pendulum roller axially overlapping the raceways rolls.

In a further embodiment, the pendulum masses can be received in recesses of the pendulum mass carrier designed as a pendulum flange, wherein to form two circumferentially spaced pendulum bearings, raceways are arranged in the recesses and on the pendulum masses axially at the same height and radially one above the other. Here, a pendulum roller rolls in the axial space of the pendulum mass carrier between the raceways of the pendulum mass carrier and the pendulum mass.

In a further embodiment of the centrifugal pendulum, the pendulum masses can be designed as rolling elements which roll on raceways arranged in a complementary manner on the pendulum mass carrier. The design of the rolling surface of the pendulum masses and the raceways forms the pendulum track.

The centrifugal pendulum can be integrated into the housing of the differential. In particular when retrofitting or to reduce the development effort, the centrifugal pendulum can be encapsulated separately from a housing of the differential by means of a centrifugal pendulum housing.

The centrifugal pendulum housing can be rotatably received on the drive shaft or on the input shaft. Here, the centrifugal pendulum housing can be supported non-rotatably outwards, for example elastically to compensate for the spring movement of the differential on the vehicle body.

In the centrifugal pendulum housing can be received a pendulum mass carrier which is non-rotatably connected to the drive shaft or the input shaft and on which pendulum masses which can be pivoted along a predetermined pendulum path can be arranged distributed over the circumference on both sides in the centrifugal force field.

In an alternative embodiment, the centrifugal pendulum housing can directly form the pendulum mass carrier, wherein the pendulum masses distributed over the circumference are received within the housing on the two axially spaced housing walls in the centrifugal force field of the rotating centrifugal pendulum housing along a predetermined pendulum path. For this purpose, the centrifugal pendulum housing is non-rotatably connected to the drive shaft or the input shaft of the differential. If necessary, the centrifugal pendulum housing can be surrounded by a protective cage, which is connected to the vehicle body, for example, with appropriate play.

BRIEF DESCRIPTION OF THE DRAWINGS

The invention is explained in more detail with reference to the exemplary embodiment shown in FIGS. 1 and 2. Therein.

DETAILED DESCRIPTION

Figure 1:
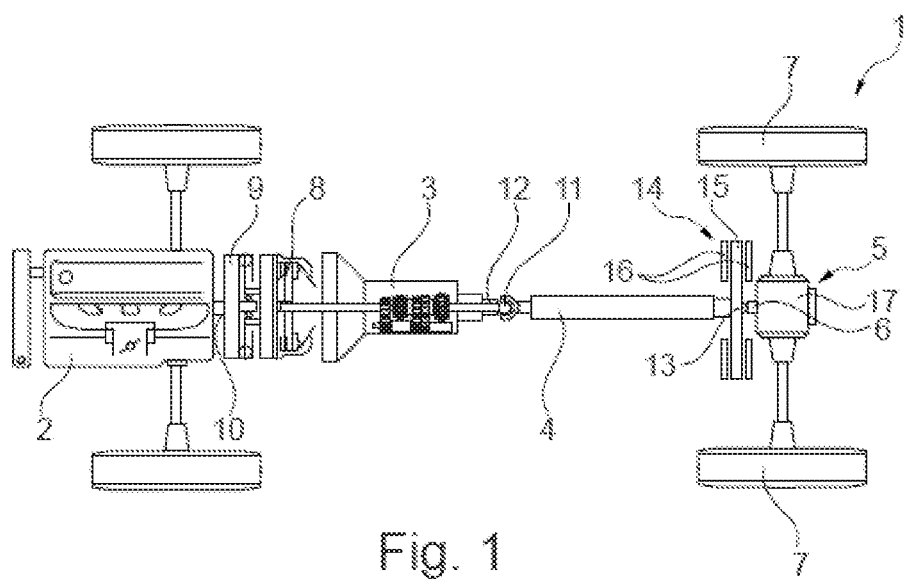
FIG. 1 shows a schematic representation of a drive train with a centrifugal pendulum received adjacent to a differential and FIG. 2 shows a partial section through a structurally designed centrifugal pendulum from FIG. 1.

FIG. 1 shows a schematic representation of the drive train 1 of a motor vehicle with the front-mounted internal combustion engine 2, the front-mounted transmission 3, the drive shaft 4, the differential 5 with the input shaft 6 and the drive wheels 7 for rear-wheel drive of the motor vehicle.

The friction clutch 8 and the first torsional vibration isolation device 9—here a dual-mass flywheel connected to the crankshaft 10 of the internal combustion engine 2, optionally with a centrifugal pendulum—are arranged between the internal combustion engine 2 and the transmission 3.

The drive shaft 4 is connected to the transmission output shaft 12 of the transmission 3 by means of the articulated connection 11, such as a universal joint, for example, and to the input shaft 6 of the differential 5 by means of the articulated connection 13, such as a universal joint, for example.

The centrifugal pendulum 14 is arranged adjacent to the differential 5. For this purpose, the pendulum mass carrier 15 of the centrifugal pendulum 14 is non-rotatably connected to the input shaft 6 or to the drive shaft 4. In the exemplary embodiment shown, the pendulum mass carrier 15 is designed as a disc-like pendulum flange on which the pendulum masses 16 distributed over the circumference are arranged on both sides by means of pendulum bearings (not shown). Axially opposite pendulum masses 16 are each connected to one another by means of connecting means extending through recesses in the pendulum mass carrier 15.

The centrifugal pendulum 14 is coordinated with the eigenmodes of the differential and, if necessary taking into account the design, of the torsional vibration isolation device 9.

To protect the centrifugal pendulum 14 or the environment, to form a burst protection and the like, the centrifugal pendulum can be surrounded in a manner not shown by a protective cage or a centrifugal pendulum housing, which can be rotatably connected to the housing 17 of the differential, for example.

Figure 2:
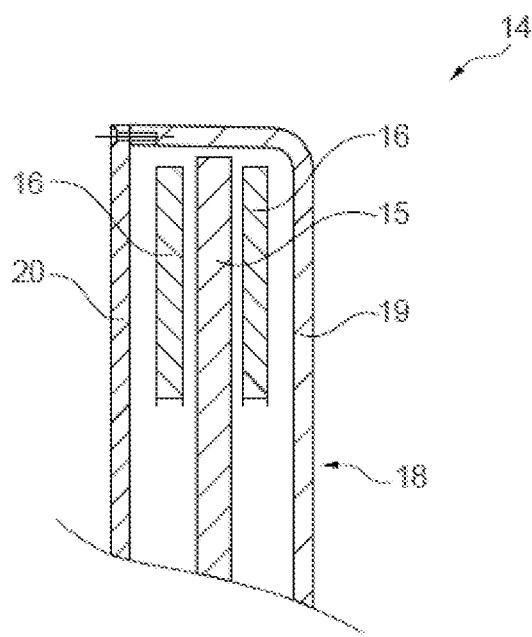

FIG. 2 shows a possible embodiment of the centrifugal pendulum 14 in partial section with the pendulum mass carrier 15 and the pendulum masses 16 arranged on both sides of the pendulum mass carrier 15. The centrifugal pendulum 14 is received in the centrifugal pendulum housing 18, which is received from the two housing parts 19, 20 connected to one another, for example screwed here. The centrifugal pendulum 14 can be encapsulated in the centrifugal pendulum housing 18 and operated wet, in that the centrifugal pendulum housing is at least partially filled with an operating medium, for example oil. In an alternative embodiment, the centrifugal pendulum 14 can be operated dry.

LIST OF REFERENCE NUMBERS

1 Drive train
2 Internal combustion engine
3 Transmission
4 Drive shaft
5 Differential
6 Input shaft
7 Drive wheel
8 Friction clutch 9 Torsional vibration isolation device
10 Crankshaft
11 Articulated connection
12 Transmission output shaft
13 Articulated connection
14 Centrifugal pendulum
15 Pendulum mass carrier
16 Pendulum mass
17 Housing
18 Centrifugal pendulum housing
19 Housing part
20 Housing part

The invention claimed is:

1. A drive train for a motor vehicle comprising: an internal combustion engine, a transmission connected downstream thereof, drive wheels, a differential arranged between the drive wheels and the transmission, and a drive shaft provided between the transmission and the differential, wherein a centrifugal pendulum is arranged between the drive shaft and the differential and is disposed adjacent to the differential.

2. The drive train according to claim 1, wherein the transmission is installed at a front of the motor vehicle and the drive wheels are provided for rear-wheel drive.

3. The drive train according to claim 1, wherein the centrifugal pendulum is enclosed separately from a housing of the differential by a centrifugal pendulum housing.

4. The drive train according to claim 1, wherein an articulated connection is provided between an input shaft of the differential and the drive shaft.

5. The drive train according to claim 4, wherein the centrifugal pendulum is assigned to the input shaft.

6. The drive train according to claim 4, wherein the centrifugal pendulum is assigned to the drive shaft.

7. The drive train according to claim 4, wherein a centrifugal pendulum housing is rotatably received on the drive shaft or on the input shaft.

8. The drive train according to claim 7, wherein the centrifugal pendulum housing receives a pendulum mass carrier which is non-rotatably connected to the drive shaft or the input shaft and on which pendulum masses which can be pivoted along a predetermined pendulum path are arranged distributed over a circumference on both sides in a centrifugal force field.

9. The drive train according to claim 4, wherein the centrifugal pendulum housing is outwardly supported in a non-rotatable manner.

10. A drive train for a motor vehicle comprising:
an internal combustion engine,
a transmission connected downstream of the internal combustion engine;
drive wheels;
a differential arranged between the drive wheels and the transmission; and
a centrifugal pendulum arranged between the transmission and the differential, the centrifugal pendulum being arranged external to a housing of the transmission.

11. The drive train of claim 10, wherein the centrifugal pendulum is disposed adjacent to the differential.

12. The drive train of claim 10, wherein the drive wheels are provided for rear-wheel drive.

13. The drive train of claim 10, wherein the centrifugal pendulum is arranged external to a housing of the differential.

14. The drive train of claim 10, wherein the centrifugal pendulum is enclosed separately from the housing of the transmission.

15. The drive train of claim 10, further comprising a drive shaft provided between the transmission and the differential, wherein the centrifugal pendulum is connected to an input shaft of the differential or the drive shaft.

16. The drive train of claim 15, wherein an articulated connection is provided between the input shaft of the differential and the drive shaft.

17. A drive train for a motor vehicle comprising:
an internal combustion engine,
a transmission connected downstream of the internal combustion engine and arranged at a front of the motor vehicle;
drive wheels arranged for rear-wheel drive;
a differential arranged between the drive wheels and the transmission; and
a centrifugal pendulum disposed adjacent to the differential.

18. The drive train of claim 17, wherein the centrifugal pendulum is arranged external to a housing of the transmission and external to a housing of the differential.

19. The drive train of claim 18, wherein the centrifugal pendulum is disposed between the transmission and the differential.

20. The drive train of claim 17, further comprising a drive shaft provided between the transmission and the differential, wherein the centrifugal pendulum is connected to an input shaft of the differential or the drive shaft.

* * * * *